United States Patent Office 3,426,012
Patented Feb. 4, 1969

3,426,012
PROCESS FOR PREPARING LINCOMYCIN-2-ACYLATES AND NOVEL INTERMEDIATE COMPOUNDS
Walter Morozowich, Kalamazoo, and Mildred J. Taraszka, Kalamazoo Township, Kalamazoo County, Mich., assignors to The Upjohn Company, Kalamazoo, Mich., a corporation of Delaware
No Drawing. Continuation-in-part of application Ser. No. 539,319, Apr. 1, 1966. This application July 27, 1966, Ser. No. 568,102
U.S. Cl. 260—210    18 Claims
Int. Cl. C07d 27/04; C07c 47/18

ABSTRACT OF THE DISCLOSURE

Process for preparing lincomycin-2-acylates which comprises condensing lincomycin with an aromatic aldehyde to produce 3,4-O-arylidene lincomycin, tritylating this compound to form 7-O-trityl-3,4-O-arylidene lincomycin, acylating this compound to form 7-O-trityl-3,4-O-arylidene lincomycin-2-acylate, and removing the protective groups to form lincomycin-2-acylate. The instant lincomycin-2-acylates are useful as antibacterial agents and disinfectants.

---

This is a continuation-in-part application of copending application Ser. No. 539,319, filed on Apr. 1, 1966, now abandoned.

This invention relates to a novel process for the preparation of lincomycin-2-acylates and novel intermediates. More particularly, this invention relates to a process which comprises condensing lincomycin with an aromatic aldehyde to produce 3,4-O-arylidene lincomycin, tritylating this compound to form 7-O-trityl-3,4-O-arylidene lincomycin, acylating this compound to form 7-O-trityl-3,4-O-arylidene lincomycin-2-acylate, and removing the protective groups to form lincomycin-2-acylate having the following structural formula:

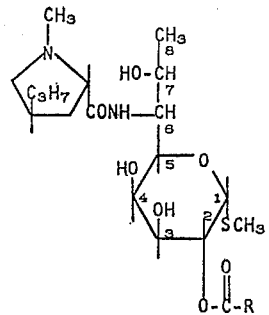

wherein

is a carboxylic acid acyl radical, advantageously of not more than 12 carbon atoms; or a halo-, nitro-, hydroxy-, amino-, cyano-, thiocyano-, or loweralkoxy-substituted hydrocarbon carboxylic acid acyl radical, advantageously of not more than 12 carbon atoms.

Lincomycin-2-acylates have essentially the same antibacterial spectrum as the antibiotic lincomycin. Thus, lincomycin-2-acylates can be used as antibacterial agents. For example, lincomycin-2-acetate inhibits the growth of Staphylococcus aureus, and, therefore, is useful as a disinfectant on washed and stacked food utensils contaminated with this organism. The lincomycin-2-acylates also can be used to inhibit Gram-positive sporeformer spreaders on agar plates when isolating molds, yeasts, Streptomycetes, and Gram-negative organisms. They can be used, for example, in the isolation of microorganisms from soil samples, as well as in the isolation of Gram-negative organisms, for example, Pseudomonas, Proteus, and Escherichia coli, from mixed infections in the presence of Staphylococci and/or Streptococci.

Lincomycin is a well-known antibiotic described in U.S. Patent 3,086,912. It contains 4 hydroxyl groups which can be esterified. The $C_2$-monoacylates of lincomycin were previously prepared by a process which comprises converting lincomycin to 3,4-O-isopropylidene lincomycin, acylating this compound to give a mixture of the corresponding $C_2$-acylate as well as $C_7$-acylate, removing the isopropylidene moiety, and then separating the $C_2$-monoacylates of lincomycin by chromatography or countercurrent distribution. The process of the subject invention is preferred over the prior art method for making $C_2$-monoacylates of lincomycin since the instant process is specific for the $C_2$-monoacylates of lincomycin. Furthermore, the specificity of the subject process eliminates the need for the cumbersome separation of a mixture of $C_2$ and $C_7$ acylates by chromatography or countercurrent distribution methods.

In the process of the subject invention, lincomycin, advantageously as the hydrochloride salt, is first condensed with an aromatic aldehyde, with the aid of mild heat, to form 3,4-O-arylidene lincomycin. Acid catalysis of the reaction is unnecessary since the hydrochloride salt of lincomycin provides sufficient catalysis of the reaction. The reaction is forced to completion through azeotropic removal of water by an organic solvent, for example, benzene, toluene, chloroform, ethylene chloride, and the like. The azeotrope-forming solvent can be eliminated if water is removed by some other means, such as by evacuation, vaporization with an inert gas, or merely by co-distillation with a solvent which has a higher boiling point than water. The azeotrope-forming solvent is used in admixture with a highly polar solvent, such as N,N-dimethylformamide, N,N-dimethylacetamide, dimethylsulfoxide, N-methyl pyrrolidone, and the like, in order to solubilize lincomycin hydrochloride and thus produce a homogeneous solution.

The condensation reaction can be conducted between temperatures of about 70° to 180° C.; the preferred temperature being about 90°–110° C. The optimum temperature depends on the ratio of polar to non-polar solvent, and on the specific properties of the non-polar solvent, such as the boiling temperature of the azeotrope formed with water as well as the boiling point of the non-polar solvent itself. The non-polar solvent containing moisture can be continuously removed by distillation and replaced periodically with fresh, dry solvent. The water also can be removed by condensation and separation with a water trap or a desiccant can be used, thus permitting the dried solvent to return to the reaction vessel.

The time for complete condensation of lincomycin hydrochloride with an aromatic aldehyde, as disclosed above, varies with the solvent composition, and the efficiency of removal of the water. When azeotrope-forming solvents are used, as described above, the course of the reaction can be followed by measuring the amount of water liberated. Alternatively, the reaction vessel can be sampled periodically and chromatographed. With solvent combinations of benzene and dimethylformamide, reaction times of about 1–16 hours can be used, with 2–3 hours being optimum. If anhydrous lincomycin hydrochloride is used, the reaction time required is reduced by approximately a factor of ½ since only one-half of the amount of water is liberated, compared with lincomycin hydrochloride monohydrate. A variety of aromatic aldehydes can be used in the process of the invention, for example,

| | |
|---|---|
| furfural | 5-methylfurfural |
| benzaldehyde | salicylaldehyde |
| m-tolualdehyde | o-tolualdehyde |
| p-tolualdehyde | o-chlorobenzaldehyde |
| m-chlorobenzaldehyde | m-bromobenzaldehyde |
| p-bromobenzaldehyde | p-methoxybenzaldehyde |
| m-methoxybenzaldehyde | o-methoxybenzaldehyde |
| 3,4-dimethoxybenzaldehyde (veratric aldehyde) | salicylaldehyde |
| | p-hydroxybenzaldehyde |
| 3,4,5-trimethoxybenzaldehyde | piperonal |
| o-nitrobenzaldehyde | p-chlorobenzaldehyde |
| phthaldehyde | m-nitrobenzaldehyde |
| p-nitrobenzaldehyde | β-naphthaldehyde |
| p-bromobenzaldehyde | o-bromobenzaldehyde |
| 2,4-dichlorobenzaldehyde | vanillin |
| methaldehyde | terephthaldehyde |
| protocatechualdehyde | cinnamaldehyde |

Also useful are the vinylogs of aromatic aldehydes, i.e., aromatic aldehydes in which the carbonyl group is separated from the aromatic moiety by one or more double bonds, giving a conjugated structure of:

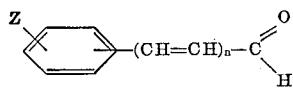

wherein $n$ can be an integer of from 1–4, and Z can be one of the following substituents on the aromatic moiety:

| | |
|---|---|
| $CH_3$ | $CN$ |
| $CH_2CH_3$ | $O(CH_2)_2CH_3$ |
| $CH(CH_3)_2$ | $OCH(CH_3)_2$ |
| $C(CH_3)_3$ | $O(CH_2)_3CH_3$, |
| $COCH_3$ | $O(CH_2)_4CH_3$ |
| $CO_2C_2H_5$ | $OC_6H_5$ |
| $CO_2H$ | $OCOCH_3$ |
| $CO_2$ | $OH$ |
| $CH_2Si(CH_3)_3$ | $SCH_3$ |
| $Si(CH_3)_3$ | $SC_2H_5$ |
| $Si(C_2H_5)_3$ | $SCH(CH_3)_2$ |
| $Ge(CH_3)_3$ | $SH$ |
| $Ge(C_2H_5)_3$ | $SCOCH_3$ |
| $Sn(CH_3)_3$ | $SCN$ |
| $Sn(C_2H_5)_3$ | $SOCH_3$ |
| $N_2^{\oplus}$ | $SO_2CH_3$ |
| $NHCOCH_3$ | $SO_2NH_2$ |
| $N(CH_3)_3^{\oplus}$ | $S(CH_3)_2^{\oplus}$ |
| $NO_2$ | $SO_3^{\ominus}$ |
| $PO_3H^{\ominus}$ | $SeCH_3$ |
| $AsO_3H^{\ominus}$ | $F$ |
| $OCH_3$ | $Cl$ |
| $OC_2H_5$ | $Br$ |
| $3,4\text{-}(CH_2)_4$ | $I$ |
| $C_6H_5$ | $IO_2$ |
| $CF_3$ | $CH=CHNO_2$ |

The acetals formed by the above-disclosed process are initially isolated as crystalline hydrochloride salts. With stable acetals, for example, 3,4-benzylidene lincomycin, and 3,4-p-chlorobenzylidene lincomycin, recrystallization of the hydrochlorides can be brought about with hot 2-methoxyethanol, dimethylformamide, chloroform, and the like. The less stable acetals, for example, 3,4-p-anisylidene lincomycin, 3,4-cinnamylidene, and 3,4-toluylidene lincomycin, must be converted to the free base form before isolation of the acetal.

The arylidene lincomycin hydrochloride salts can be converted to the free base by mixing the salts with a basic material, for example, aqueous sodium hydroxide, a quaternary ammonium hydroxide, ammonium hydroxide, or a strong amine base. The insoluble arylidene lincomycin base can be removed by filtration, or it can be extracted with water-immiscible solvents, for example, chloroform, methylene chloride, ethylene dichloride, ether, and the like. Alternatively, the arylidene lincomycin hydrochloride salts can be converted to the free base by first neutralizing the salt with a base after placing the salt in solution in a solvent such as chloroform, dimethylformamide, dimethylacetamide, propylene glycol, and the like. The base can be an alkoxide, an amine, ammonia, or a solid inorganic base, for example, sodium hydroxide, potassium hydroxide, and the like. The resulting solutions of the arylidene lincomycin base can be recovered from water-miscible solvents by dilution with water to the cloud point resulting in slow crystallization of the acetals. The solutions of arylidene lincomycin base in water-immiscible solvents can be recovered by dilution of the solution with a nonpolar solvent, for example, hexane, isomeric hexanes, and the like, or by simply evaporating the solvent. The latter procedure for forming the free base from the arylidene lincomycin hydrochloride salts is suitable for isolating the very labile acetals of lincomycin, since a non-aqueous procedure can be employed.

Most of the arylidene lincomycin bases can be purified by solution of the compound in acetone, diluting the solution with ether, and then adding hexane to the cloud point to induce spontaneous crystallization.

Trityl ethers of 3,4-O-arylidene lincomycin are prepared by reacting an excess of trityl halide, or substituted trityl halide with 3,4-arylidene lincomycin in the presence of a strong base and a suitable solvent. The preferred mole ratio of trityl halide or substituted trityl halide to 3,4-arylidene lincomycin is 4:1. Higher ratios of tritylating agent to 3,4-arylidene lincomycin can be used (up to about 10:1), although increasing amounts of di-tritylated by-products are formed with a large excess of tritylating agent. Lower mole ratios of tritylating agent to 3,4-arylidene lincomycin (below 1:1) result in an incomplete reaction, as well as formation of additional unidentified by-products.

The preferred trityl halide in the above reaction is trityl chloride. However, other trityl halides and substituted trityl halides of the following formula can be used:

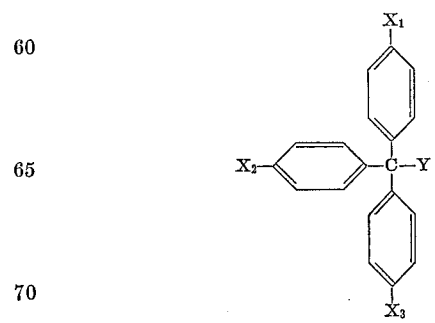

wherein Y is selected from the group consisting of Cl and Br and $X_1$, $X_2$ and $X_3$ are selected from the group consisting of hydrogen, halogen and $OCH_3$.

The compounds of the type in which the substituents $X_1$, $X_2$, and $X_3$ are mono-, di-, or tri-para chloro may be made by the methods reported by Gomberg [Ber. 37, 1633 (1904)]. The corresponding compounds in which $X_1$, $X_2$, and $X_3$ are para methoxy may be prepared by the methods described by Smith et al., and references therein [J. Am. Chem. Soc., 84,430 (1962), see page 436].

The preferred solvent for the tritylation is acetone. Other solvents which can be used are 2-butanone, 2-pentanone, 3-pentanone, ether, benzene, N,N-dimethylformamide, N,N-dimethylacetamide, dimethylsulfoxide, methyl acetate, ethyl acetate, pyridine, and the like. Use of the higher boiling polar solvents, however, results in the production of additional by-products from the reaction; whereas the lower boiling solvents do not permit a complete reaction.

The preferred base is triethylamine. Other strongly basic tri-alkyl amines can be used, for example, triethylenediamine, N-alkylmorpholine derivatives, tripropylamine, tributylamine, and the like. Tertiary bases having a pKa greater than 8 permit a more rapid reaction since better solubility of the arylidene lincomycin is maintained. Weaker bases, such as pyridine, require longer reaction times since arylidene lincomycin is largely insolubilized as the hydrochloride salt in the presence of such a base.

The reaction time is determined by several factors, for example, the boiling point of the solvent, the strength of the base, the concentration and ratio of trityl halide to 3,4-arylidene lincomycin, and the polarity of the solvent. For example, with the following mole ratio of trityl chloride to anisylidene lincomycin to triethylamine to acetone of 4.8:1.0:7.6:22.4, the preferred reaction time at reflux temperature is 24 hours. Reaction times up to 48 hours can be used although increasing amounts of 2,7 - di-O-trityl-3,4 - O-anisylidene lincomycin are formed. Reaction times less than six hours result in appreciable amounts of unchanged anisylidene lincomycin. With other mode ratios, the operating reaction time can range from 1 to 100 hours.

Upon completion of the tritylation reaction, the product 7-O-trityl-3,4-O-arylidene lincomycin is precipitated by the addition of a nonpolar solvent such as hexane, heptane, pentane, cyclohexane, benzene, and the like. The crude reaction product is repeatedly recrystallized from hot acetonitrile and finally from hot acetone-water (1:1) mixture to provide a pure preparation of 7-O-trityl-3,4-O-arylidene lincomycin. Other organic solvents can be used for recrystallization, for example, 2-butanone, 3-pentanone, n-propanol, 2-propanol, butyl acetate, benzene, butyronitrile, N,N-dimethylformamide-water, N,N-dimethyl-acetamide-water, methanol-water, ethanol-water and the like.

7-O-trityl-3,4-O-arylidene lincomycin can be acylated by reacting it with an acid halide or anhydride of a selected hydrocarbon carboxylic acid in the presence of an acid-binding agent, for example, a tertiary amine to produce 7-O-trityl-3,4-O-arylidene lincomycin-2-acylate. Suitable tertiary amines include heterocyclic amines such as pyridine, quinoline, and isoquinoline; trialkylamines such as trimethylamine, triethylamine, triisopropylamine, and the like; N,N-dialkylanilines such as dimethylaniline, diethylaniline, and the like; and N-alkylpiperidines such as N-ethylpiperidine, N-methylpiperidine, and the like. The preferred base is pyridine. Carboxylic acids suitable for esterification include (a) saturated or unsaturated, straight or branched chain aliphatic carboxylic acids, for example, acetic, propionic, butyric, isobutyric, tert-butylacetic, valeric, isovaleric, caproic, caprylic, decanoic, dodecanoic, lauric, tridecanoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclopenteneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromaticaliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxydrocarbon carboxylic acids include hydrocarbon carboxylic acids as given above which are substituted by one or more of halogen, nitro, hydroxy, amino, cyano, or thiocyano, or loweralkoxy, advantageously loweralkoxy of not more than six carbon atoms, for example, methoxy, ethoxy, propoxy, butoxy, amyloxy, hexyloxy, and isomeric forms thereof. Examples of such substituted hydrocarbon carboxylic acids are mono-, di-, and trichloracetic acid; α- and β-chloropropionic acid; α- and γ-bromobutyric acid; α- and δ-iodovaleric acid; mevalonic acid; 2- and 4-chlorocyclohexanecarboxylic acid; shikimic acid; 2-nitro-1-methyl-cyclobutanecarboxylic acid; 1,2,3,4,5,6 - hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methyl-cyclohexanecarboxylic acid; 2,5-dibromo-2-methylcyclohexanecarboxylic acid; 4,5-dibromo-2-methylcyclohexanecarboxylic acid; 5,6-dibromo-2-methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2 - dibromo-4 - methyl-cyclohexanecarboxylic acid; 3-bromo-2,2,3-trimethylcyclopentanecarboxylic acid; 1-bromo-3,5-dimethylcyclohexanecarboxylic acid; homogentisic acid, o-, m-, and p-chlorobenzoic acid; anisic acid; salicylic acid; p-hydroxybenzoic acid; β-resorcyclic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid; lactic acid; ethoxyformic acid (ethyl hydrogen carbonate); and the like.

The acylation is advantageously conducted by treating a suspension of 7-O-trityl-3,4-O-arylidene lincomycin in a teritary amine with an acid halide or anhydride and heating the resulting mixture, if desired, for a short period at about 100° C. to complete the reaction. Water is added to the reaction mixture to hydrolyze the acylating agent and the desired product is isolated by conventional procedures. Thus, upon reacting 7-O-trityl-3,4-O-anisylidene lincomycin in the presence of a tertiary amine with at least 1 mole of acylating agent, there is obtained 7-O-trityl-3,4-O-anisylidene lincomycin-2-acylate.

Lincomycin-2-acetate can be prepared from 7-O-trityl-3,4-arylidene lincomycin-2-acylate by the selective removal of the trityl and arylidene groups. The removal of these protective groups can be accomplished by a mild acid hydrolysis. For example, the protective groups in 7-O-trityl-3,4-O-anisylidene lincomycin-2-acetate are cleaved in approximately 120 minutes in 0.1 N HCl in methanol-water (80:20) at 37° C. In 80% aqueous acetic acid, the protective groups are removed in 10 minutes at 100° C. Cleavage of the protective groups also occurs rapidly upon hydrogenolysis. For example, upon hydrogenating 7-O-trityl-3,4-p-methoxybenzylidene lincomycin-2-acylate in the presence of a palladium catalyst, there is obtained lincomycin-2-acylate, tritane, and p-methoxytoluene. Upon removal of the protective groups, the solvent can be removed by means well known in the art, for example, evaporation. The lincomycin-2-acylate can be recovered from the reaction mixture by extraction with ether after basification. The lincomycin-2-acylate can be isolated as the hydrochloride salt by treating the ether solution with hydrogen chloride gas and the compound can be crystallized from an appropriate solvent.

The sequence of the above reactions starting with lincomycin can be shown as follows:

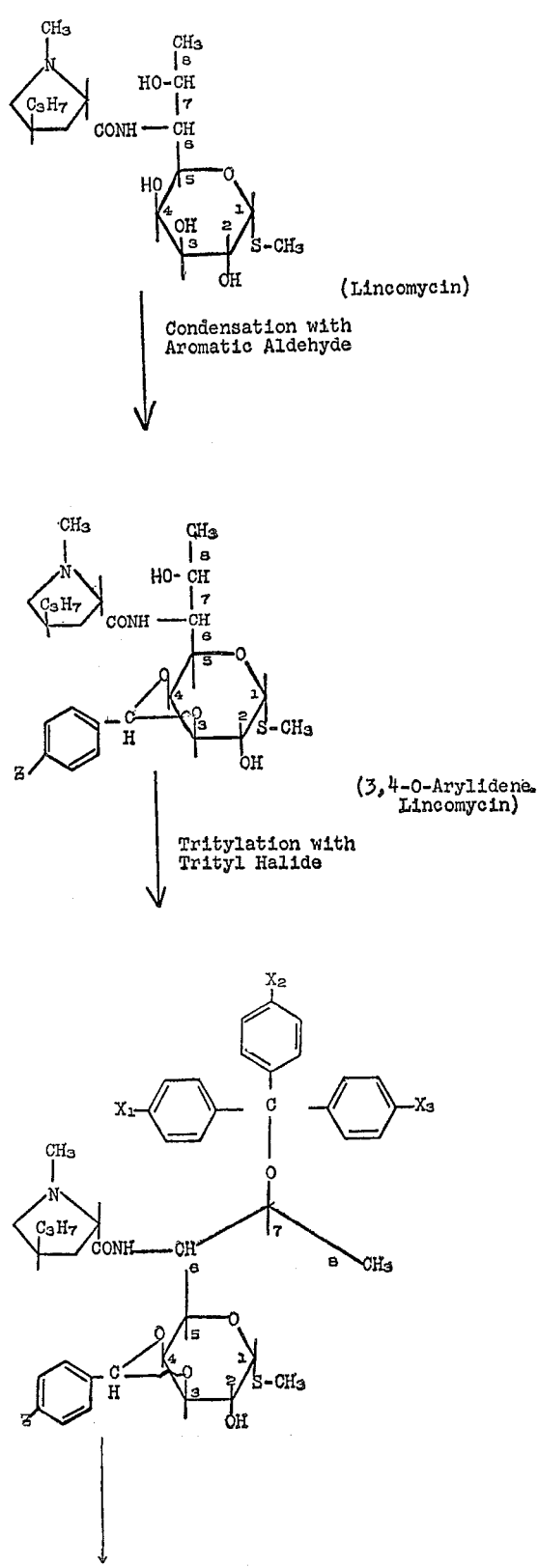

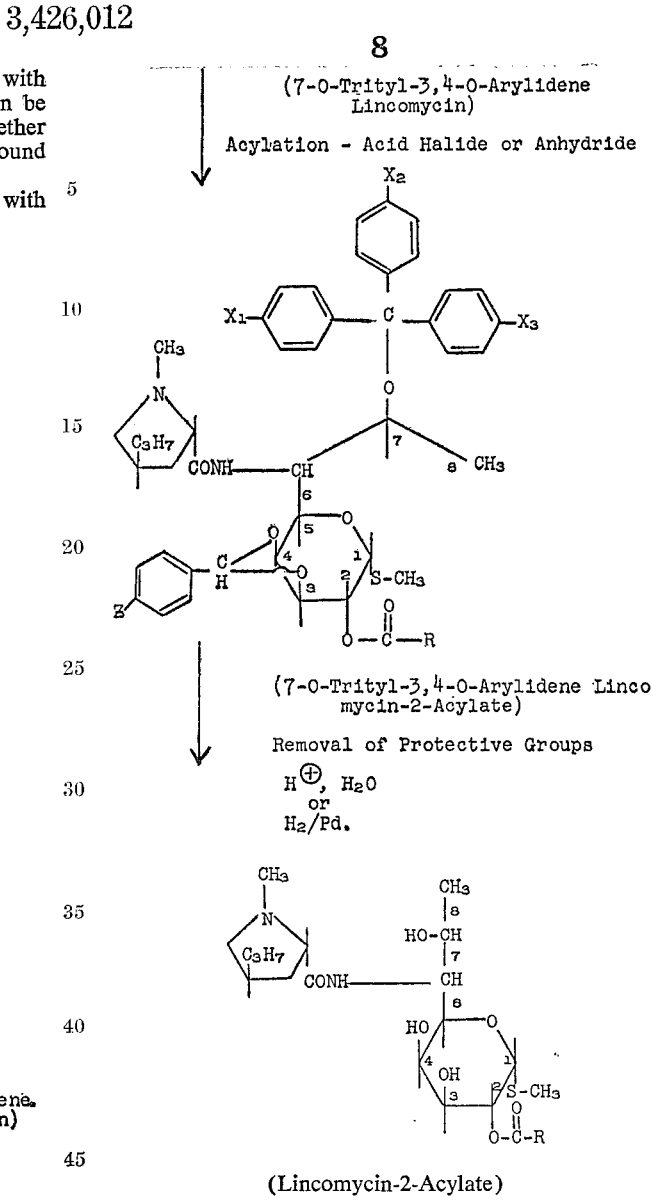

The following examples are illustrative of the process and products of the present invention, but are not to be construed as limiting.

EXAMPLE 1.—3,4-O-Arylidene Lincomycins

Part A.—3,4-O-anisylidene lincomycin hydrochloride and 3,4-O-anisylidene lincomycin base A solution of 47.0 gm. (0.1 mole) lincomycin-hydrochloride hemihydrate dissolved in a mixture of 125 ml. dimethylformamide, 75 ml. anisaldehyde and 160 ml. benzene was heated in a bath at 140° C. The benzene-water azeotrope was allowed to distill at 105°–110° C., and upon collecting each 50 ml. of distillate, an additional 50 ml. dry benzene was added. Crystallization of 3,4-O-anisylidene lincomycin hydrochloride occurred after 100 ml. of distillate was collected, and, after an additional 250 ml. of distillate was collected, the reaction flask was allowed to cool to room temperature. The pale brown reaction mixture was treated with 200 ml. of ether, and the solids were isolated by filtration and washed with ether. After drying the solids at 40° C. in vacuo, the yield of crude white 3,4-O-anisylidene lincomycin hydrochloride was 43.0 gm. A portion of this hydrochloride salt was converted to the free base as follows: A suspension of 21.0 gm. of 3,4-O-anisylidene lincomycin hydrochloride in 150 ml. of water was shaken with 15 ml. of 2 N sodium hydroxide in a separatory funnel. The curdly product of 3,4-O-anisylidene lincomycin base was extracted with four 400 ml. portions of ether. The ether extracts were combined, dried with sodium sulfate, and concentrated to 100 ml. by distillation. After standing in the refrigerator overnight, the white needle-like crystals of 3,4-O-anisylidene lincomycin base were removed by filtration and washed with ether-hexane 1:1. The crystals were dried in vacuo; yield, 13.2 grams. An additional 4.7 grams of 3,4-O-anisylidene lincomycin base was obtained by adding hexane to the mother liquor to give a total recovery of 17.9 grams.

*Analysis.*—Calcd. for $C_{26}H_{40}N_2O_7S$: C, 59.53; H, 7.69; N, 5.34; S, 6.10; eq. wt. 524.63; $H_2O$, 0. Found: C, 59.77; H, 7.66; N, 5.34; S, 6.17; eq. wt. 524; $H_2O$, 0. $[\alpha]_D^{25°}+96°$ (1.08%, EtOH). $\lambda$ max. 95% EtOH 226.5 m$\mu$ ($\epsilon$ 14,775.)

Part B.—3,4-O-p-chlorobenzylidene lincomycin hydrochloride

Twenty grams of anhydrous lincomycin hydrochloride was treated with 60 ml. p-chlorobenzaldehyde and the mixture was brought to 120° C. and held there for 15 minutes. The solution, which contained a small amount of insolubles, was treated with 50 ml. benzene and the benzene-water azeotrope was permitted to distill. After collecting 25 ml. of distillate, an additional 25 ml. of benzene was added; a total of 300 ml. of benzene was thus added. The brown suspension remaining was cooled and diluted with 200 ml. of ether. Solids were isolated by filtration, washed with ether, and dried; yield, 25 gm. of pale yellow crude 3,4-O-p-chlorobenzylidene lincomycin hydrochloride.

A solution of 9.4 grams of the above compound was prepared in 1000 ml. of preheated, boiling methyl Cellosolve (ethylene glycol monomethyl ester). This solution was filtered, then rapidly cooled to room temperature. The resulting crystals of 3,4-O-p-chlorobenzylidene lincomycin hydrochloride were isolated by filtration, washed with cold methyl Cellosolve, and finally washed with ether and dried in vacuo; yield, 2.0 grams of white crystalline 3,4-O-p-chlorobenzylidene lincomycin hydrochloride.

*Analysis.*—Calcd. for $C_{25}H_{38}N_2O_6SCl_2$: C, 53.09; H, 6.77; N, 4.95; S, 5.67; Cl, 12.54; eq. wt., 567.58; $H_2O$, 0. Found: C, 52.24; H, 7.10, N, 4.65; S, 5.63 Cl, 11.79; eq. wt., 567; $H_2O$, 0. $\lambda$ max. 95% EtOH 220 m$\mu$ ($\epsilon$ 12,150.)

Part C.—3,4-O-benzylidene lincomycin hydrochloride

A suspension of 12.0 gm. lincomycin hydrochloride hemihydrate in 95 ml. benzene and 100 ml. of benzaldehyde was heated in a bath at approximately 120° C., and the benzene-water azeotrope was allowed to distill. Fifty ml. increments of benzene were aded after each 50 ml. of distillate was collected. A total of 300 ml. of benzene was used. The reaction vessel was cooled to room temperature and the remaining yellow mixture was diluted with 300 ml. of ether. Solids were collected by filtration and washed with ether to give 11.8 gm. of a pale yellow compound identified as 3,4-O-benzylidene lincomycin hydrochloride. This compound was dissolved in 750 ml. preheated boiling methyl Cellosolve, the solution quickly filtered, then cooled to room temperature. (This latter operation is performed, advantageously, in 3–5 minutes in order to prevent extensive decomposition of the acetal.) The flask was cooled in the freezer for two hours, and the crystals of 3,4-O-benzylidene lincomycin hydrochloride were isolated by filtration, washed with cold methyl Cellosolve, followed by a wash with ether; yield, 6.6 gm. of white crystals of 3,4-O-benzylidene lincomycin hydrochloride.

*Analysis.*—Calcd. for $C_{25}H_{38}N_2O_6S \cdot HCl$: C, 56.53; H, 7.40; N, 5.28; Cl, 6.68; S, 6.04; eq. wt., 531.10; $H_2O$, 0. Found: (Corrected for $H_2O$) C, 55.66; H, 7.59; eq. wt., 532; $H_2O$, 0.36. $\lambda$ max. 95% EtOH 228 m$\mu$ ($\epsilon$ 2,300).

Part D.—3,4-O-p-toluylidene lincomycin hydrochloride

Twenty grams of anhydrous lincomycin hydrochloride was treated with 50 ml. p-tolualdehyde and 70 ml. benzene as described in the synthesis of 3,4-O-benzylidene lincomycin hydrochloride. Part C. The yield of crude pale yellow 3,4-O-toluylidene lincomycin hydrochloride was 24.4 gm. Twenty-one grams of this product was recrystallized quickly from methyl Cellosolve and dried in vacuo; yield, 9.6 gm. of white crystals of 3,4-O-p-toluylidene lincomycin hydrochloride.

*Analysis.*—Calcd. for $C_{26}H_{41}N_2O_6SCl$: C, 57.28; H, 7.58; N, 5.56; S, 5.88; Cl, 6.50; eq. wt., 545.13; $H_2O$, 0. Found: (Corrected for $H_2O$) C, 56.03; H, 7.76; N, 5.58; S, 5.95; Cl, 6.31; eq. wt., 541; $H_2O$, 0.33. $\lambda$ max. 95% EtOH 211 m$\mu$ (Sh.) ($\epsilon$ 9,950).

Part E.—3,4-O-p-hydroxybenzylidene lincomycin hydrochloride and 3,4-O-p-hydroxybenzylidene lincomycin base A solution of 22.0 gm. of lincomycin hydrochloride hemihydrate and 35 gm. recrystallized p-hydroxybenzaldehyde, dissolved in a mixture of 100 ml. dimethylformamide and 75 ml. benzene, was set up for distillation as described in the synthesis of 3,4-O-anisylidene lincomycin, Part A. The crude 3,4-O-p-hydroxybenzylidene lincomycin hydrochloride, thus obtained, amounted to 24.1 gm. This compound was treated with dilute ammonium hydroxide and the resulting semi-solid mass was extracted with ether. The ether layer was evaporated to dryness and the resulting solid was dried under high vacuum at 45° C. This compound was chromatographed on a 4 x 27 cm. column of Florisil (a synthetic silicate of the type described in U.S. Patent 2,393,625 and sold by the Floridin Co.) using 500 ml. methyl ethyl ketone, followed, stepwise, by 500 ml. methyl ethyl ketone-acetone (1:1). Incomplete resolution was found. The desired product was spread in fractions 13–47. Fractions 30–37. (15 ml. each) were pooled and evaporated to dryness under vacuum. The residue was dissolved in 100 ml. of chloroform and extracted twice with 50 ml. of water. The chloroform extract was dried with sodium sulfate, then diluted with 100 ml. ether followed by 600 ml. hexane. The resulting semi-solid precipitate was dissolved in 25 ml. acetone and the solution was diluted with 100 ml. ether followed by 600 ml. of hexane. The slightly tacky solid was dried overnight under high vacuum at room temperature to a brittle solid preparation of 3,4-O-hydroxybenzylidene lincomycin base which was easily powdered.

*Analysis.*—Calcd. for $C_{25}H_{38}N_2O_7S$: C, 58.80; H, 7.50; N, 5.49; S, 6.28; $H_2O$, 0; eq. wt., 510.67. Found: (Corrected for $H_2O$) C, 58.11; H, 7.76; N, 5.42; S, 6.16; $H_2O$, 170; eq. wt., 498.

Part F.—3,4-O-cinnamylidene lincomycin hydrochloride and 3,4-O-cinnamylidene lincomycin base Twenty-two grams of anhydrous lincomycin hydrochloride was treated with 100 ml. cinnamaldehyde and 75 ml. benzene, as described in the synthesis of 3,4-O-anisylidene lincomycin, Part A. A crude preparation of 3,4-O-cinnamylidene lincomycin hydrochloride (24.8 gm.) was recovered. A portion (about half) of this crude preparation of 3,4-O-cinnamylidene lincomycin hydrochloride was treated with dilute ammonium hydroxide and the resultant sticky mass was isolated, washed with water, and dried at 55° C. under high vacuum to a tan solid. Five grams of this compound was dissolved in a mixture of 700 ml. boiling acetonitrile and 10 ml. cinnamaldehyde. The solution was clarified by filtration, then the filtrate was stored in the freezer for 8 hours. The resulting crystals were removed by filtration, washed with ether, and dried; yield 2.3 gm. of 3,4-O-cinnamylidene lincomycin base.

*Analysis.*—Calcd. for $C_{27}H_{40}N_2O_6S$ (eq. wt., 520.7): C, 62.28; H, 7.74; N, 5.38; S, 6.16; $H_2O$, 0. Found: C, 60.87; H, 7.74; N, 5.22; S, 6.06; $H_2O$, 0. λ max. 95% EtOH mμ (ε 19,550).

EXAMPLE 2.—7-O-Trityl-3,4-O-Anisylidene Lincomycin

A solution of 8.0 g. (15.2 mmoles) 3,4-O-anisylidene lincomycin, prepared as in Example 1, Part A, in 25 ml. acetone was treated with 16 ml. triethylamine and 20 g. (72 mmoles) trityl chloride, in the order given. The reaction flask was fitted with a condenser and calcium chloride tube and the mixture was refluxed for 24 hours. Trityl chloride dissolved upon heating to reflux and triethylamine hydrochloride slowly crystallized out. The crystallized triethylamine hydrochloride from the above reaction was removed by filtration and the remaining brown filtrate was diluted first with 100 ml. cyclohexane, and then with 350 ml. hexane to incipient turbidity. The mixture was allowed to stand at room temperature overnight. The resulting yellow crystals of crude 7-O-trityl-3,4-O-anisylidene lincomycin were isolated by filtration, washed with hexane, and air dried; yield, 9.4 g. A portion of this material, 9.3 g., was dissolved in 100 ml. acetonitrile. The solution was partly decolorized with 1.0 g. of activated carbon. Upon concentration of the solution by distillation to 30 ml., spontaneous crystallization of 7-O-trityl-3,4-O-anisylidene lincomycin occurred. These crystals were isolated by filtration and recrystallized twice from acetonitrile; yield, 6.45 g. of pale yellow crystals of 7-O-trityl-3,4-O-anisylidene lincomycin. This preparation was dissolved in 160 ml. hot acetone and the solution was diluted with 140 ml. hot (50° C.) water to incipient turbidity. Crystallization of 7-O-trityl-3,4-O-anisylidene lincomycin rapidly occurred. After cooling the reaction mixture at 0° C. for one hour, white crystals of 7-O-trityl-3,4-O-anisylidene lincomycin were isolated by filtration, washed with acetone-water (1:2) and air dried; yield, 6.2 g. The melting point of these crystals was 203–204° C.

*Analysis.*—Calcd. for $C_{45}H_{54}N_2O_7S$ (eq. wt., 767.01): C, 70.47; H, 7.10; N, 3.65; S, 4.18. Found: C, 70.58; H, 7.41; N, 3.70; S, 4.39.

EXAMPLE 3.—7-O-Trityl-3,4-O-Anisylidene LincomyCin 2-Benzoate

7-O-trityl-3,4-O-anisylidene lincomycin (1.0 g., 1.30 mmoles) was dissolved in 10 ml. chloroform and 1.10 ml. pyridine in a flask protected from moisture and fitted with a dropping funnel. A solution of 0.60 ml. of benzoyl chloride and 1 ml. chloroform was added dropwise over a one-half hour period. After dilution with 25 ml. of $CHCl_3$, the solution was extracted with 200 ml. five percent $Na_2CO_3$ and then extracted with three 200-ml. portions of water. The chloroform layer was dried with sodium sulfate and about 10% of the cholorform was removed by distillation. The resulting solution was diluted with 40 ml. hexane and gentle scratching of the flask produced immediate crystallization of 7-O-trityl-3,4-O-anisylidene lincomycin 2-benzoate. After three hours at room temperature, white crystals of 7-O-trityl-3,4-O-anisylidene lincomycin 2-benzoate were isolated by filtration, washed with hexane and air dried; yield, 805 mg. The melting point of these crystals was 144–145°.

*Analysis.*—Calcd. for $C_{52}H_{58}N_2O_8S$ (eq. wt., 871.12): C, 71.70; H, 6.71; N, 3.22; S, 3.68. Found: C, 71.32; H, 6.89; N, 3.42; O, 3.71.

EXAMPLE 4.—Lincomycin 2-Benzoate

Part A.—Cleavage of protective groups with acid

7-O-trityl - 3,4 - O-anisylidene lincomycin 2-benzoate (490 mg.), prepared as in Example 3, was dissolved in 4 ml. glacial acetic acid. The solution was diluted with 0.8 ml. water and then heated at 100° C. for 20 minutes. The hot solution was diluted with water to crystallize tritanol. After cooling the solution, tritanol was removed by filtration and the filtrate was concentrated to a viscous residue under high vacuum at 25° C. This residue was dissolved in 25 ml. water and the solution was treated with 10 ml. 30% sodium carbonate. The resulting white precipitate of lincomycin 2-benzoate was extracted with four 15 ml. portions of chloroform. The extracts were combined and dried with sodium sulfate and concentrated to about 12 ml. by atmospheric distillation. The concentrated solution was evaporated to a viscous residue under vacuum at 25° C. and the residue was dissolved in 35 ml. ether. The solution was cooled to 0° C. and hydrogen chloride gas was introduced to precipitate lincomycin 2-benzoate hydrochloride. Lincomycin 2-benzoate hydrochloride was isolated by filtration under pressure with nitrogen. The product was washed with ether and dried under high vacuum; yield, 270 mg. of white amorphous lincomycin 2-benzoate hydrochloride. A portion of this preparation, 240 mg., was dissolved in 6 ml. tetrahydrofuran, treated with 50 mg. activated carbon and filtered. The remaining filtrate was diluted first with 10 ml. acetone, then slowly with 20 ml. ether over a five minute period to precipitate lincomycin 2-benzoate hydrochloride, which was isolated by filtration and dried under high vacuum; yield, 225 mg.

*Analysis.*—Calcd. for $C_{25}H_{39}ClN_2O_7S$ (eq. wt., 547.13): C, 54.88; H, 7.19; S, 5.86; Cl, 6.48. Found: (Corrected for $H_2O$): C, 55.59; H, 7.58; S, 5.83; Cl, 6.43; $H_2O$, 4.40.

Part B.—Hydrogenolysis of 7-O-trityl-3,4-O-anisylidene lincomycin-2-benzoate

One part of 7-O-trityl-3,4-O-anisylidene lincomycin-2-benzoate, prepared as in Example 3, is dissolved in a mixture of 20 parts 95% ethanol and 20 parts of acetic acid. To this is added 0.1 part of palladium catalyst and the mixture is shaken with hydrogen gas at atmospheric pressure or under low pressure (1–3 atmospheres). The catalyst is removed by filtration and the solvent is removed under vacuum. The residue is extracted with dilute hydrochloric acid and the insoluble tritane is removed by filtration. Lincomycin-2-benzoate is isolated using the procedure described above in Part A.

EXAMPLE 5

By substituting the benzoyl chloride in Example 3 by propionyl chloride, isobutyryl chloride, valeryl chloride, isovaleryl chloride, neopentylacetyl chloride, hexanoyl chloride, heptanoyl chloride, phenylacetyl chloride, toluoyl chloride, cyclopentanepropionyl chloride, 1-cyclopentene-1-propionyl chloride, cyclohexaneacetyl chloride, acrylyl chloride, crotonyl chloride, 2-hexynoyl chloride, 2-octynoyl chloride, chloroacetyl bromide, p-chlorobenzoyl chloride, anisoyl chloride, salicyloyl bromide, p-nitrobenzoyl chloride, and cyanoacetyl chloride, there are obtained 7-O-trityl-3,4,-O-anisylidene lincomycin-2-propionate, -isobutyrate, -valerate, -isoyalerate, -neopentylacetate, -hexanoate, -heptanoate, -phenylacetate, -toluate, -cyclopetanepropionate, -1-cyclopentene - 1 - propionate, -cyclohexaneacetate, -acrylate, crotonate, -2-hexynoate, 2-octynoate, -chloroacetate, -p-chlorobenzoate, -anisate, -salicylate, p-nitrobenzoate, and -cyanoacetate, respectively.

EXAMPLE 6

By substituting the 7-O-trityl-3,4-O-anisylidine lincomycin-2-benzoate in Example 4 by the compounds obtained in Example 5, there are obtained the corresponding lincomycin-2-acylates.

EXAMPLE 7—7-O-TRITYL - 3,4 - O - ANISYLIDENE LINCOMYCIN-2-PALMITATE-HCl AND LINCOMYCIN-2-PALMITATE-HCl

7-O-trityl-3,4-O-anisylidene lincomycin (7.60 grams) was dissolved in 20 ml. of pyridine and a mixture of 3.56 grams of palmitoyl chloride and 5 ml. of chloroform was added dropwise over a 15-minute period while stirring. After one-half hour, 5 ml. of water was added and the solution was evaporated to a viscous residue of 7-O-trityl-3,4-O-anisylidine lincomycin-2-palmitate·HCl under high vacuum. The residue was dissolved in 25 ml. acetic acid, 5 ml. water was added, and the solution was refluxed for 30 minutes. The solution was concentrated to a viscous residue under high vacuum at 40° C. and the residue was dissolved in 30 ml. 95% ethanol. The ethanol solution was diluted with 175 ml. of acetone and 5.1 gm. of lincomycin-2-palmitate·HCl slowly crystallized. The compound was recrystallized from a mixture of 50 ml. of acetone and 2.6 ml. of water. The sample was dried at 40° under high vacuum for 24 hours. M.P. 124–131° C.

Analysis.—Calcd. for $C_{34}H_{65}N_2O_7SCl$: C, 59.93; H, 9.62; N, 4.11; S, 4.71; Cl, 5.20. Found: C, 59.86; H, 9.72; N, 4.06; S, 4.89; Cl, 5.10. (Corr. for 1.76% $H_2O$.)

EXAMPLE 8

By substituing the palmitoyl chloride in Example 7 by stearyl chloride there is obtained lincomycin-2-stearate·HCl.

EXAMPLE 9

By substituting the palmitoyl chloride in Example 7 by myristryl chloride there is obtained lincomycin-2-myristrate·HCl.

Lincomycin-2-acylates wherein the acyl radical contains from 14 to 18 carbon atoms do not have the characteristic bitterness found in the lower lincomycin-2-acylates. This property makes the higher acylates useful as antibacterials in environments where bitterness is a disadvantage. For example, lincomycin-2-acylates wherein the acyl radical contains from 14 to 18 carbon atoms can be used to treat pets orally. Thus, a pet having an infection by a Gram positive microorganism such as *Staphylococcus aureus* can be given an oral preparation of lincomycin-2-acylate wherein the acyl radical contains from 14 to 18 carbon atoms and the pet will not reject the medication.

We claim:

1. A process for preparing compounds selected from the group consisting of the free bases and acid addition salts of compounds of the structural formula:

wherein $$R-\overset{O}{\underset{\|}{C}}-$$

is a carboxylic acid acyl radical or a halo-, nitro-, hydroxy-, amino-, cyano-, thiocyano-, or lower alkoxy-substituted hydrocarbon carboxylic acid acyl radical which comprises:

(1) condensing lincomycin with an aromatic aldehyde or a vinylog thereof to produce 3,4-O-arylidene lincomycin;

(2) tritylating 3,4-O-arylidene lincomycin with a tritylating agent selected from the group consisting of trityl halides and substituted trityl halides to form 7-O-trityl-3,4-O-arylidene lincomycin;

(3) acylating 7-O-trityl-3,4-O-arylidene lincomycin with an acylating agent selected from the group consisting of lower-alkoxy carbonyl halides and the acid halides and acid anhydrides of hydrocarbon carboxylic acids and hydrocarbon carboxylic acids substituted with halo-, nitro-, hydroxy-, amino-, cyano-, and thiocyano-groups to produce 7-O-trityl-3,4-O-arylidene lincomycin-2-acylates;

(4) selectively removing the arylidene and trityl groups from 7-O-trityl-3,4-O-arylidene lincomycin-2-acylate by
  (a) subjecting 7-O-trityl-3,4-O-arylidene lincomycin-2-acylate to a mild acid hydrolysis, or
  (b) hydrogenating 7-O-trityl-3,4-O-arylidene lincomycin-2-acylate in the presence of a palladium catalyst; and (5) isolating lincomycin-2-acylate so produced.

2. The process of claim 1 for preparing a compound wherein R is benzoyl which comprises:

(1) condensing lincomycin hydrochloride hemihydrate with anisaldehyde to produce 3,4-O-anisylidene lincomycin hydrochloride;

(2) reacting 3,4-O-anisylidene lincomycin hydrochloride with trityl chloride to produce 7-O-trityl-3,4-O-anisylidene lincomycin;

(3) reacting 7-O-trityl-3,4-O-anisylidene lincomycin with benzoyl chloride in the presence of an acid acceptor to produce 7-O-trityl-3,4-O-anisylidene lincomycin-2-benzoate; and (4) reacting 7-O-trityl-3,4-O-anisylidene lincomycin-2-benzoate with glacial acetic acid to produce lincomycin-2-benzoate.

3. A compound selected from the group consisting of 3,4-O-arylidene lincomycin and acid addition salts thereof.

4. 3,4-O-anisylidene lincomycin, a compound of claim 3.

5. The hydrochloride salt of the compound of claim 4.

6. 3,4-O-p-chlorobenzylidene lincomycin hydrochloride, a compound of claim 3.

7. 3,4-O-benzylidene lincomycin hydrochloride, a compound of claim 3.

8. 3,4-O-toluylidene lincomycin hydrochloride, a compound of claim 3.

9. 7-O-trityl-3,4-O-arylidene lincomycin.

10. 7-O-trityl-3,4-O-anisylidene lincomycin, a compound of claim 9.

11. A compound selected from the group consisting of 7-O-trityl-3,4-O-arylidene lincomycin-2-acylate and acid addition salts thereof.

12. 7-O-trityl-3,4-O-anisylidene lincomycin-2-benzoate, a compound of claim 11.

13. A process for preparing compounds selected from the group consisting of the free bases and acid addition salts of compounds of the structural formula:

wherein Z is selected from the group consisting of halogen, methoxy, nitro, and alkyl of from 1 to 8 carbon atoms, which comprises condensing lincomycin with a compound selected from the group consisting of an aromatic aldehyde and substituted aromatic aldehyde to produce 3,4-O-arylidene lincomycin.

14. A process for preparing compounds of the structural formula:

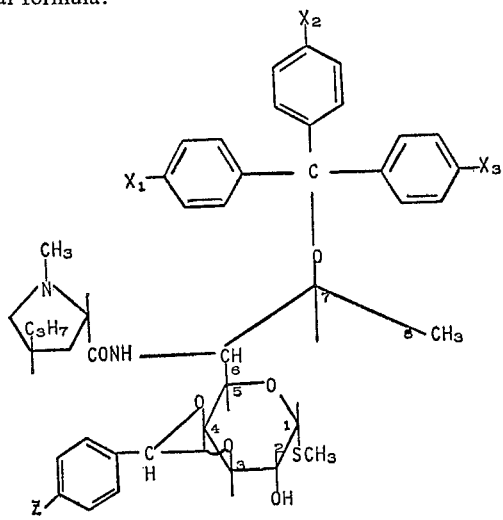

wherein $X_1$, $X_2$, and $X_3$ are selected from the group consisting of hydrogen, halogen, and $OCH_3$; Z is as defined in claim 13; which comprises:
(1) condensing lincomycin with a compound selected from the group consisting of an aromatic aldehyde and substituted aromatic aldehyde to produce 3,4-O-arylidene lincomycin; and
(2) tritylating 3,4-O-arylidene lincomycin with a tritylating agent of the formula:

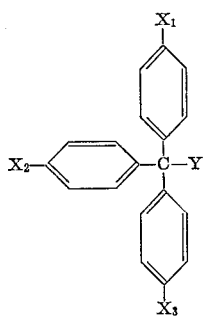

wherein Y is selected from the group consisting of chlorine and bromine, and $X_1$, $X_2$, and $X_3$ are selected from the group consisting of hydrogen, halogen, and $OCH_3$, to form 7-O-trityl-3,4-O-arylidene lincomycin.

15. 7 - O - trityl - 3,4 - O - anisylidene lincomycin - 2 - palmitate.

16. A compound of the formula:

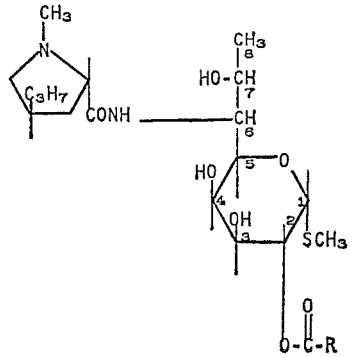

wherein

is an aliphatic carboxylic acid acyl radical of from 14 to 18 carbon atoms, inclusive; or its acid addition salts.

17. Lincomycin-2-palmitate hydrochloride, a compound of claim 16.

18. The hydrochloride of the compound defined in claim 15.

References Cited

UNITED STATES PATENTS

| | | | |
|---|---|---|---|
| 3,262,926 | 7/1966 | Magerlein | 260—210 |
| 3,280,104 | 10/1966 | Moffatt et al. | 260—211.5 |
| 3,282,918 | 11/1966 | Hoeksema et al. | 260—210 |

LEWIS GOTTS, *Primary Examiner.*

JOHNNIE R. BROWN, *Assistant Examiner.*

U.S. Cl. X.R.

260—999